United States Patent

Mederer et al.

[11] Patent Number: 5,999,894
[45] Date of Patent: Dec. 7, 1999

[54] METHOD FOR THE ANALYSIS OF PROCESS DATA OF AN INDUSTRIAL PLANT

[75] Inventors: Hans-Gerd Mederer, Erlangen; Thorsten Führing, München; Konstantin Jacoby, Johannesberg; Jiri Panyr, München; Rainer Michelis, Oberhaching, all of Germany

[73] Assignee: Siemens Aktiengesellschaft, Munich, Germany

[21] Appl. No.: 08/850,857

[22] Filed: May 2, 1997

Related U.S. Application Data

[63] Continuation of application No. PCT/DE95/01471, Oct. 23, 1995.

[30] Foreign Application Priority Data

Nov. 2, 1994 [DE] Germany .............................. 44 38 859

[51] Int. Cl.⁶ ...................................................... G21C 7/36
[52] U.S. Cl. .......................... 702/182; 702/62; 364/188; 706/915
[58] Field of Search .................................... 364/184, 188, 364/492; 702/62, 182; 395/914, 915, 907; 73/865.9; 376/215, 245, 256; 206/915

[56] References Cited

U.S. PATENT DOCUMENTS

| | | | |
|---|---|---|---|
| 5,623,109 | 4/1997 | Uchida et al. .......................... | 73/865.9 |
| 5,625,574 | 4/1997 | Antoney et al. ......................... | 364/550 |

FOREIGN PATENT DOCUMENTS

| | | | |
|---|---|---|---|
| 4198729 | 7/1992 | Japan . | |

OTHER PUBLICATIONS

"Modern Process Visualizing and Multimedia in the Service of Optimal Operation of Power Plants" (Zinser et al.), ABB Technik Sep. 1993, pp. 27–32.

"Selective Detecting of Measurement and Setting Errors in Gas Distribution Nets" (Lappus), atp 32, 1990, pp. 447–454.

"1993, International Conference on Systems, Man and Cybernetics" Systems Engineering in the Service of Humans, vol. 3, Oct. 17–20, 1993, pp. 61–66.

"Knowledge Based Fault Diagnosis for Technical Processes" (Isermann), 8129 Automatisierungstechnik, No. 11, Munich 1988, pp. 421–426.

"Discrete Mathematics" (Kalmbach), Publisher Fiedr. Vieweg & Sohn, Braunschweig, Wiesbaden, 1981;p.

"Restructuring Lattice Theory: An Approach Based on Hierarchies of Conepts" (Wille), Proc. NATO Adv. Study Institute, Banff/Can. 1981, pp. 445–470.

*Primary Examiner*—Kamini Shah
*Attorney, Agent, or Firm*—Herbert L. Lerner; Laurence A. Greenberg

[57] ABSTRACT

In a method for the analysis of process data of an industrial plant, in particular a power station plant, parts of the plant are automatically controlled for the purpose of information compression, filtering and diagnosing faults in good time. Features characterizing the plant process are first prescribed and parameters relevant to the plant process are provided. Subsequently, the presence of each feature is checked for each plant part by using the parameters. Correlations between combinations of plant parts or features are determined by using features common to various plant parts and plant parts common to various features. Next, the plant parts and/or the features are represented as information elements positioned in such a way that the distance between two information elements in each case represents the degree of their correlation.

8 Claims, 3 Drawing Sheets

METHOD FOR THE ANALYSIS OF PROCESS DATA OF AN INDUSTRIAL PLANT

CROSS-REFERENCE TO RELATED APPLICATION

This application is a continuation of application Ser. No. PCT/DE95/01471, filed Oct. 23, 1995, now World Patent WO 9614609.

BACKGROUND OF THE INVENTION

1. Field of the Invention

The invention relates to a method for the analysis of process data of an industrial plant, in particular of a power station plant, the parts of which plant are automatically controlled.

In a control room for controlling an industrial plant, in particular a power station plant, large quantities of various measurement data occur continuously and in their entirety describe a plant state or operating state. The operating personnel of the plant have the task of identifying the measurement data or measurement variables that are respectively relevant to the operating state as well as the task of following, analyzing and interpreting their values in relation to the state of the plant. At the same time, the guidance of the process from the control room is largely determined through screens by way of standards and guidelines in the form of regulations. Those regulations include symbols for parts of the plant or elements of the plant such as, for example, pumps and valves, the coloring of indicators and the construction of the indicators of a control system. In addition to the various indicators, there is commonly a plant diagram which represents the entire plant in overview. However, with increasing automation and complexity of such an industrial plant, the number of measurement data that are recorded also increases, and therefore the probability that information important to the respective operating state of the plant is not identified as such in good time. Corresponding counter measures can thus only be belatedly initiated.

SUMMARY OF THE INVENTION

It is accordingly an object of the invention to provide a method for the analysis of process data of an industrial plant, in particular of a power station plant, which overcomes the hereinafore-mentioned disadvantages of the heretofore-known methods of this general type, with which special features in a plant process are indicated directly and with which it is possible to take counter measures in good time, in particular in the case of disturbances.

With the foregoing and other objects in view there is provided, in accordance with the invention, a method for the analysis of process data of an industrial plant, in particular a power station plant, having automatically controlled plant parts, which comprises prescribing features characterizing a plant process and providing parameters relevant to the plant process; checking the presence of each feature for each plant part using the parameters; determining correlations between combinations of plant parts or features, respectively, using features common to various plant parts and plant parts common to various features; and representing the plant parts and/or the features as information elements positioned in relation to one another, for representing a degree of correlation of two of the information elements in each case by a distance between the two information elements.

In this configuration, the invention proceeds from the consideration that, on the basis of the mathematical model of formal concept analysis, large quantities of process data can be filtered, compressed and/or structured in accordance with the principle that "contextual proximity corresponds to spatial proximity" in relation to their significance for the plant state. The fundamentals of formal concept analysis are, for example, summarized in publications M. Luxemburger entitled: "Implikationen, Abhängigkeiten und Galois-Abbildungen. Beiträge zur formalen Begriffsanalyse" [Implications, Dependencies and Galois Mapping. Contributions to Formal Concept Analysis], Dissertation, TH Darmstadt (1993) and Proc. NATO Adv. Study Inst., Banff, Canada 1981, pages 445–470 (1982), as well as a publication by G. Kalmbach entitled: "Diskrete Mathematik. Ein Intensivkurs für Studienanfänger mit Turbo-Pascal-Programmen" [Discrete Mathematics. An Intensive Course for Beginners, with Turbo-Pascal Programs] (1981).

A list of features is provided from the information system of the industrial plant, which is part of the operating system of the plant. The features as a whole describe all of the possible operating states or plant states. The features themselves are, for example, status messages or other messages which describe the state of a part of the plant uniquely and which, for their part, can be members of series of messages. The assignment of the features to the parts of the plant is carried out by using parameters that are currently recorded or modeled (simulated) and which are likewise provided by the information system of the industrial plant.

The contextual proximity or the proximity in terms of content of two parts of the plant in each case is then determined by the relationship of the number of the features which are common to them to the number of those features that are exhibited by at least one of the parts of the plant. In other words: in each case two parts of the plant which agree in all features are classified as particularly close in terms of content, whereas two parts of the plant which agree in none of the features are classified as not close in terms of content.

In order to provide the graphical representation, the proximity in terms of content of two parts of the plant is transformed into a spatial proximity of information elements representing the parts of the plant. The spatial proximity of two features in each case is determined in an analogous manner, with use being made of the number of those parts of the plant which exhibit these features in common. The assignment of features to each part of the plant exhibiting them, using the parameters, uniquely determines the correlation or the relationship between these features and this part of the plant.

In accordance with another mode of the invention, the parameters provided by the information system of the industrial plant are a component part of event messages which characterize changes of operating states or deviations from the normal state of the plant. In this case, the event messages are uniquely assigned to the corresponding parts of the plant using specific identifiers.

The graphical representation which is generated can be merely a configuration of information elements representing parts of the plant or merely a configuration of information elements representing features. Preferably, however, information elements both of parts of the plant and of features are represented graphically.

In accordance with a further mode of the invention, the positioning of the information elements in relation to one another within the configuration is determined in such a manner that the following criterion is fulfilled: if a part of the plant exhibits a feature, the distance of its information elements in relation to one another is smaller than a prescribable first limiting value. If a part of the plant does not exhibit a feature, the distance between its information elements is greater than a prescribable second limiting value.

In order to enable the information which is important for an identification of the respective plant state to be provided to the operating personnel in a particularly simple and/or clear manner, the measurement data picked up within the plant process or parameters derived therefrom are filtered.

In accordance with an added mode of the invention, a determination as to which of the parts of the plant are represented is made on the basis of a prescribed criterion. For example, those parts of the plant can be represented which agree in one feature such as, for example, in the state "disturbance"/"no disturbance", or in the status ON/OFF.

In accordance with an additional mode of the invention, a time window is prescribed as a criterion, so that relationships or interactions can be detected between those parts of the plant which report disturbances within a specific time interval. As a result, conclusions can be drawn regarding causative disturbances, in contrast to symptomatic disturbances.

In accordance with yet another mode of the invention, in order to be able to detect a development trend in the direction of a disturbance in good time, a time window can also be prescribed as feature. In this way, a time-based ordering of the information elements representing the parts of the plant and features is possible.

In accordance with yet a further mode of the invention, information elements of successive event messages are represented together as a state complex. The state complex in this case can have a characteristic structure, the pattern of which has a direct relationship with a system behavior.

In accordance with yet an added mode of the invention, in this case a system state is forecast from the common representation of the information elements. In this way it is possible to already counteract an incipient disturbance in a suitable manner during the initial stage.

In accordance with yet an additional mode of the invention, the state complex is compared with a reference complex derived from plant-specific knowledge. Patterns which are characteristic of a specific plant behavior are then prescribed in this reference complex. For example, a disturbance proceeding from a rapid closure of a safety valve in a power station plant can be provided in the form of a reference complex. Comparing the state complex with this reference complex therefore permits an on-line incipient rapid closure to be detected on the basis of the disturbance messages proceeding therefrom.

The information space in which the information elements are represented is n-dimensional and preferably 3-dimensional.

In accordance with a concomitant mode of the invention, three spatial coordinates are determined in order to fix the position of each information element in this information space. A 3-dimensional representation is thus possible on a suitable display device, for example on a monitor screen, in the control room.

Other features which are considered as characteristic for the invention are set forth in the appended claims.

Although the invention is illustrated and described herein as embodied in a method for the analysis of process data of an industrial plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
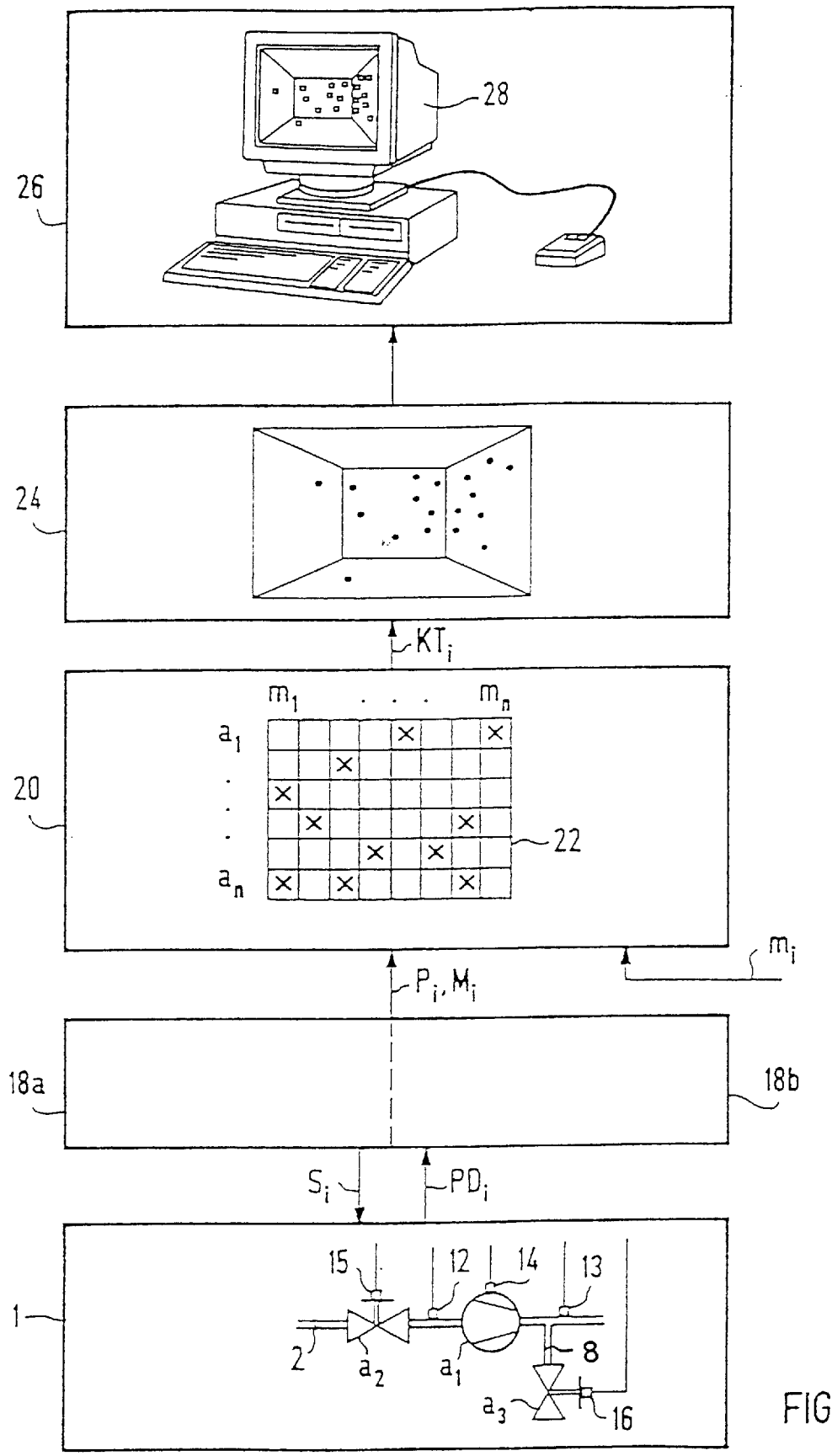
FIG. 1 is a functional diagram with components provided for carrying out an analysis method for an industrial plant.

Referring now to the figures of the drawings in detail and first, particularly, to FIG. 1 thereof, there is seen an exemplary embodiment of a process sequence within a plant component 1 which is part of an entire process of a power station plant that is not shown in greater detail. The plant component 1 includes a pump $a_1$ connected in a steam line 2, a steam valve $a_2$ connected upstream of the pump $a_1$ and a blow-off control valve $a_3$ in a branch line 8. A flow sensor 12 provided between the pump $a_1$ and the steam valve $a_2$ registers the quantity of steam flowing through the steam line 2 per unit time. In addition, a pressure sensor 13 is provided on the pressure side of the pump $a_1$. The pump $a_1$ is provided with a rotational speed sensor 14. The steam valve $a_2$ and the blow-off control valve $a_3$ have respective control and feedback elements 15 and 16. The pump $a_1$ and the steam valve $a_2$, as well as the blow-off control valve $a_3$ are also designated below as parts $a_1$ to $a_3$ or merely as parts $a_i$ of the plant.

Measured values registered by the sensors 12, 13 and 14, as well as feedback signals output by the feedback elements 15 and 16, are fed in the form of process data $PD_i$ to an automation system 18a and a process control information system 18b.

The process data $PD_i$ are pre-processed in automation units of the automation and information system 18a, 18b of the power station plant. If necessary, control signals $S_i$ are output to the plant parts $a_i$ of the plant component 1. Converging information about measurement, regulation and control events and about the signal generation is stored in the information system 18b. The power station plant with its plant parts $a_i$, such as, for example, the pump $a_1$ and the valves $a_2$ and $a_3$ of the plant component l, are automatically controlled through the use of processes running within the automation and information system 18a, 18b.

Parameters $P_i$ that are relevant to the plant process and thus also to the process running within the plant component 1 are generated by the automation and information system 18a, 18b and combined into messages $M_i$, by using the process data $PD_i$ and the control signals $S_i$. These messages $M_i$ also include identifiers identifying the parts $a_i$ of the plant.

The parameters $P_i$ and/or the messages $M_i$ are provided to an analysis module 20. Features $m_i$ characterizing the plant process are furthermore fed to the analysis module 20. These features $m_i$ are status messages, disturbance messages and state messages as well as functional, process-technological and structural details of the parts $a_i$ of the plant or plant components. These details describe the mode of operation of the parts of the plant and their configuration and assignment within the entire plant. Within the analysis module 20, the presence of the features $m_i$ is checked for each part $a_i$ of the plant by using the parameters $P_i$, or on the basis of the messages $M_i$ for a prescribed time window. For this purpose, a context $KT_i$ is generated for each time window. A unique assignment of features $m_i$ to parts $a_i$ of the plant is carried out in the context, in the form of a matrix 22.

Spatial coordinates are assigned to the parts $a_i$ of the plant and/or the features $m_i$ in a positioning module 24 by using information present in the contexts $Kt_i$. At the same time, in accordance with the principle that "contextual proximity corresponds to spatial proximity" the degree of the correlations between combinations of parts $a_i$ of the plant and between combinations of features $m_i$ is determined. This is done in such a way that, for example, for two parts $a_i$ of the plant, the ratio of the number of features $m_i$ common to them to the number of the features $m_i$ which is exhibited by at least one of the two parts $a_i$ of the plant, is determined. A quantitative measure for the degree of correlation between these two parts $a_i$ of the plant then results from this ratio. If, for example, both parts $a_i$ of the plant exhibit only common features $m_i$, the two parts $a_i$ of the plant are correlated to a high degree. In contrast, two parts $a_i$ of the plant are not correlated with each other if they differ in all of the features $m_i$. This quantitative measure of the correlation between two parts $a_i$ of the plant is transformed into a corresponding distance of their spatial coordinates from each other. The correlation of the features $m_i$ with one another is determined in an analogous manner, by making analogous use of the number of the parts $a_i$ of the plant exhibiting them.

A graphic representation for the parts $a_i$ of the plant and the features $m_i$ is generated in a graphic module 26 on the basis of this spatial assignment. Firstly, information elements $I_i(a_i)$ (shown in FIG. 3) for the parts $a_i$ of the plant and information elements $I_i(m_i)$ (shown in FIG. 3) for the features $m_i$ are generated by the graphic module 26 and positioned on a display 28 on the basis of the spatial coordinates. The common configuration of the information elements $I_i(a_i)$ and $I_i(m_i)$ is carried out in this case under the following condition: the distance between an information element $I_i(m_i)$ and an information element $I_i(a_i)$ does not exceed a prescribed first limiting value if this part $a_i$ of the plant exhibits this feature $m_i$, and this distance does not fall below a prescribed second limiting value if this part $a_i$ of the plant does not exhibit this feature $m_i$. In other words: if a part $a_i$ of the plant exhibits a feature $m_i$, the information elements $I_i(a_i)$ and $I_i(m_i)$ representing them may not be positioned too far from each other. If, in contrast, a part $a_i$ of the plant does not exhibit a feature $m_i$, the information elements $I_i(a_i)$ and $I_i(m_i)$ representing them may not be too close.

If, for example, a disturbance in a part of the non-illustrated plant connected in the steam line 2 leads to a pressure increase in the steam line 2, the rotational speed of the pump $a_1$ falls, and the blow-off control valve $a_3$ opens. The automation system 18$a$ thereupon closes the steam valve $a_2$, so that the rotational speed of the pump $a_1$ normalizes and the blow-off control valve $a_3$ closes once more. After a subsequent renewed opening of the steam valve $a_2$ by the automation system 18$a$, the pressure within the steam line 2 increases once more, so that the process repeats until the disturbance has been eliminated.

Process data $PD_i$ describing this process, that is to say the steam quantity registered by the flow sensor 12 and the steam pressure registered by the pressure sensor 13, as well as the pump rotational speed registered by the rotational speed sensor 14, are fed to the process-control information system 18$b$. Control signals $S_i$ for opening or closing the valves $a_2$ and $a_3$ are output by the automation system 18$a$ to the plant component 1 as a reaction to the process data $PD_i$ entering into the process-control information system 18$b$.

Messages $M_i$ are drawn up from the process data $PD_i$ and the control signals $S_i$ for the purposes of analysis. Such messages $M_i$ are, for example: "time $t_1$-plant component 1 - pressure sensor 13 - pressure too high-disturbance-high priority"; "time $t_2$-plant component 1 - rotational speed sensor 14 - rotational speed too low-disturbance-high priority"; "time $t_3$-plant component 1 - blow-off valve $a_3$ status signal open"; "time $t_3$-plant component 1 - steam valve $a_2$-status signal closed"; and so on.

Through the use of these messages $M_i$, features $m_i$ are assigned in the analysis module 20 to the parts $a_1$, $a_2$ and $a_3$ of the plant. In other words, through the use of the messages $M_i$, the presence of each feature $m_i$ of these parts $a_1$, $a_2$ and $a_3$ of the plant is checked. All of the features $m_i$ belonging to the message component "plant component 1" are thus assigned to each of the parts $a_1$, $a_2$ and $a_3$ of the plant. As a result, the parts $a_1$, $a_2$ and $a_3$ of the plant already agree in a multiplicity of features $m_i$, so that they are correlated to a high degree. Accordingly, these parts $a_1$ to $a_3$ of the plant have closely adjacent spatial coordinates assigned to them in the positioning module 24. A graphic representation, which is drawn up on the basis of this spatial assignment in the graphic module 26, is shown in FIG. 2.

Figure 2:
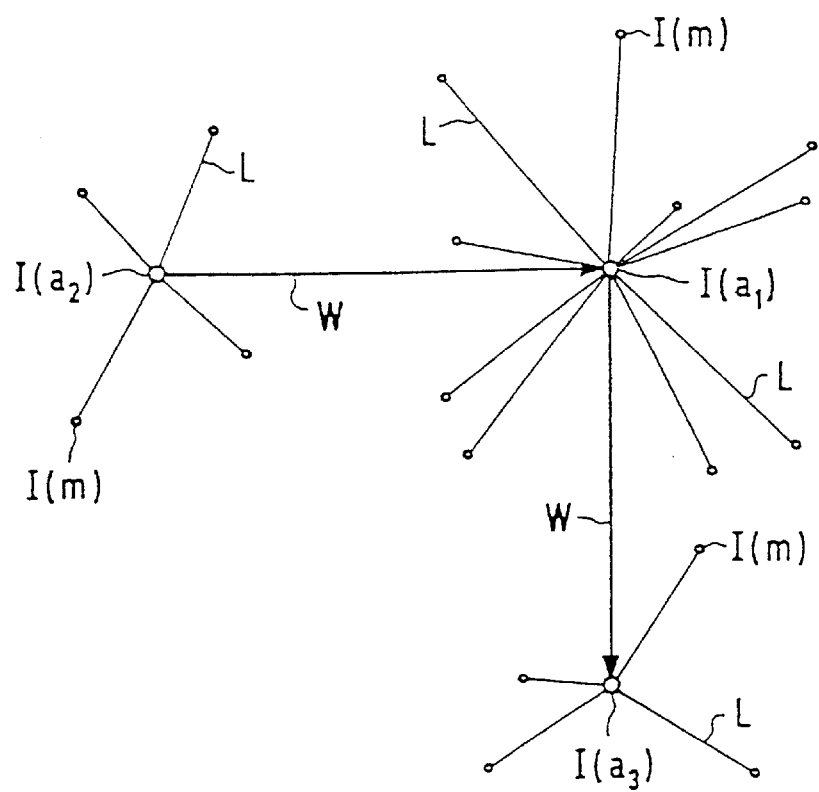
FIG. 2 is a diagram showing a configuration of information elements representing parts of the plant and their features, which configuration is characteristic of an operating state of the industrial plant.

As can be seen from FIG. 2, in this case the information elements $I_1(a_1)$ and $I_3(a_3)$ and $I_1(m_i)$ to $I_3(m_i)$ which are assigned to the parts $a_1$ to $a_3$ of the plant and the features $m_i$, are shown together. In order to provide improved clarity, the information elements $I_{1-3}(m_i)$ of the features $m_i$ and the information elements $I_{1-3}(a_{1-3})$ of the parts $a_1$ to $a_3$ of the plant exhibiting these features $m_i$ are connected by so-called incidence lines L. The information elements $I_i(a_i)$ are represented in the form of squares or cubes, while the information elements $I_{1-3}(m_i)$ of the features $m_i$ are illustrated in the form of circles or spheres. The influence of the parts $a_1$, $a_2$ and $a_3$ of the plant on one another in this case is symbolized by action arrows W.

The messages or event messages $M_i$ also exhibit time features. A time correlation of the parts $a_i$ of the plant can be derived on the basis of these time features. For example, two of the above-mentioned messages $M_i$ exhibit the same time feature "$T_3$", so that simultaneity of the associated events is drawn as the conclusion.

Figure 3:
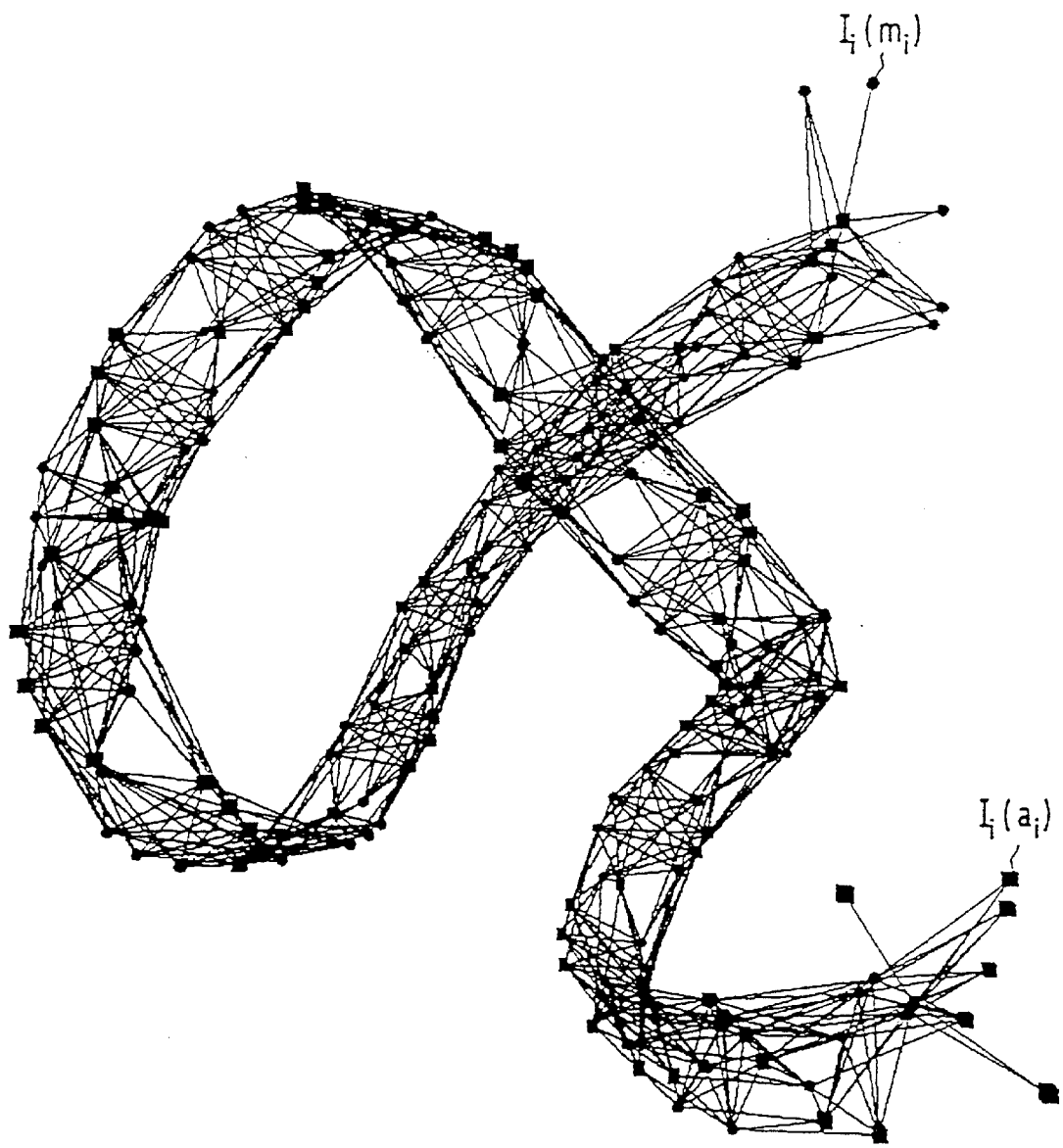
FIG. 3 is a diagram showing a state complex characteristic of a trend of an operating behavior of the plant.

Information elements $I_i(a_i, m_i)$ which are correlated in time or in another way are represented in the form of a state complex for the purpose of a diagnosis. This is shown in FIG. 3. A state complex of this type has a characteristic pattern according to the type of a disturbance, on the basis of which the type and development of the disturbance over time can be identified. Such a state complex can also be stored as a reference complex which can be used for a comparison with current events.

We claim:

1. A method for the analysis of process data of an industrial plant having automatically controlled plant parts, which comprises:

determining which of the plant parts are represented for determining correlation by using a prescribable criterion;

prescribing a time window as the criterion;

prescribing features characterizing a plant process and providing parameters relevant to the plant process;

checking the presence of each feature for each plant part using the parameters;

determining correlations between combinations of plant parts or features using features common to various plant parts and plant parts common to various features; and representing at least one of the plant parts and the features as information elements positioned in relation to one another, for representing a degree of correlation of two of the information elements in each case by a distance between the two information elements.

2. The method according to claim 1, which comprises combining a specific identification of plant parts and the parameters relating to respective operating states of the plant parts to form event messages.

3. The method according to claim 1, which comprises determining the positioning of the information elements representing the plant parts and of the information elements representing the features, for preventing the distance between an information element representing a feature and an information element representing a plant part from exceeding a prescribable first limiting value if that plant part exhibits that feature, and for preventing that distance from falling below a prescribable second limiting value if that plant part does not exhibit that feature.

4. The method according to claim 1, which comprises prescribing a time window as a feature.

5. The method according to claim 2, which comprises representing the information elements of successive event messages together as a state complex.

6. The method according to claim 1, which comprises forecasting a system state from a common representation of the information elements.

7. The method according to claim 5, which comprises comparing the state complex with a reference complex derived from plant-specific knowledge.

8. The method according to claim 1, which comprises determining three spatial coordinates to fix the position of each information element.

* * * * *